United States Patent Office
2,988,312
Patented June 13, 1961

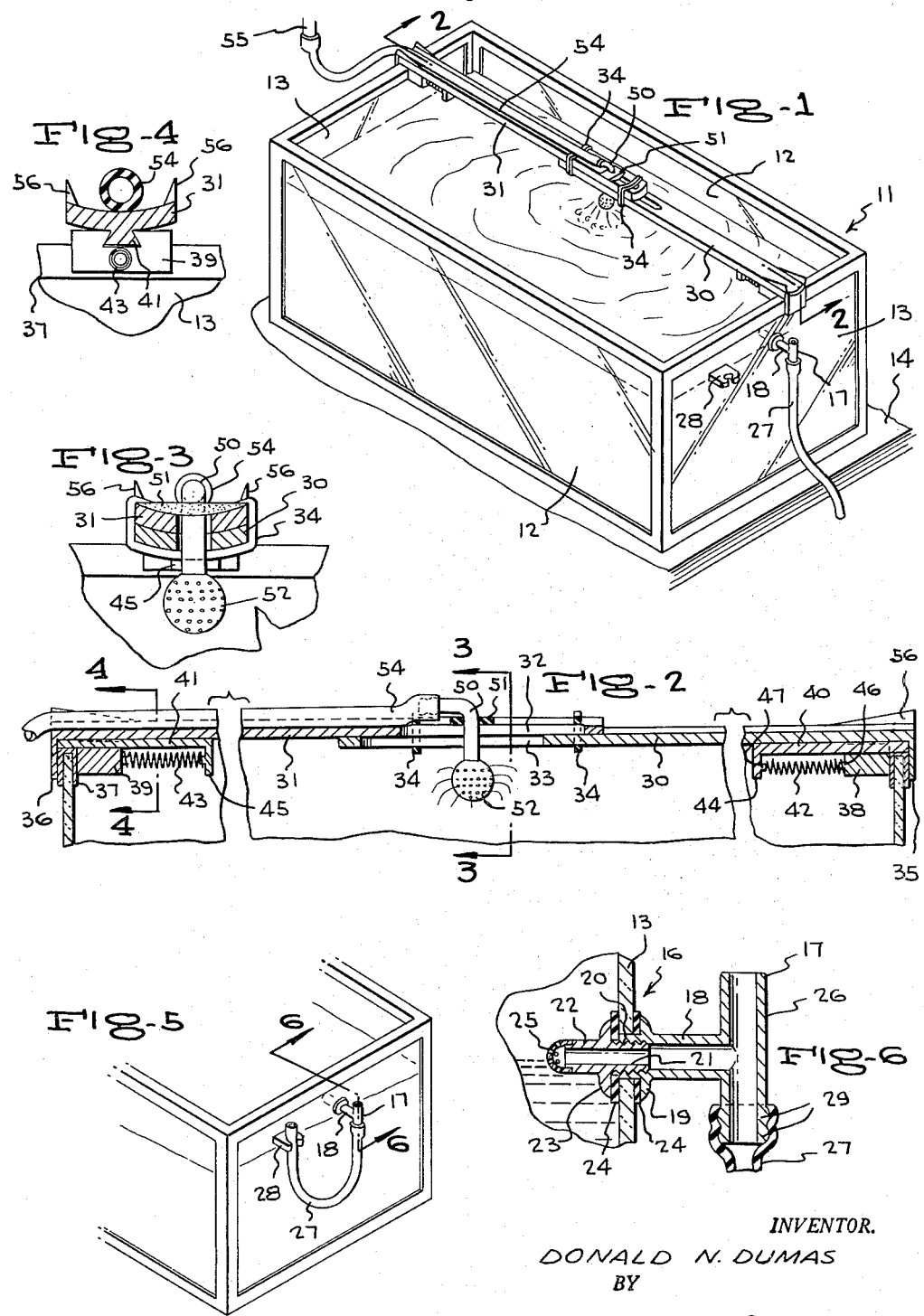

2,988,312
AUTOMATIC AQUARIUM ATTACHMENT
Donald N. Dumas, 3702 Trafalgar St., New Orleans, La.
Filed Sept. 11, 1959, Ser. No. 839,455
4 Claims. (Cl. 248—79)

This invention relates to aquaria, and more particularly to means for furnishing aerated water to an aquarium.

A main object of the invention is to provide a novel and improved means for furnishing aerated water to an aquarium, said means being simple in construction, being easy to install, and being neat in appearance.

A further object of the invention is to provide an improved attachment which may be employed to supply aerated water to an aquarium, said attachment being inexpensive to fabricate, being durable in construction, being attractive in appearance, and involving only a few parts.

Further objects and advantages of the invention will become apparent from the following description and claims, and from the accompanying drawings, wherein:

FIGURE 1 is a perspective view of an aquarium provided with improved water supply means and overflow means in accordance with the present invention;

FIGURE 2 is an enlarged fragmentary longitudinal vertical cross sectional view of the aquarium taken on the line 2—2 of FIGURE 1;

FIGURE 3 is an enlarged cross sectional detail view taken on the line 3—3 of FIGURE 2;

FIGURE 4 is an enlarged cross sectional detail view taken on the line 4—4 of FIGURE 2;

FIGURE 5 is a fragmentary perspective view of one end portion of the aquarium of FIGURE 1, showing the manner in which the overflow tube is normally supported in a non-operating position; and FIGURE 6 is an enlarged vertical cross sectional view taken on the line 6—6 of FIGURE 5.

Referring to the drawings, 11 generally designates an aquarium of the type provided with vertical side walls 12, 12 and vertical end walls 13, 13, as well as a horizontal bottom wall adapted to engage the top surface of a suitable supporting table or platform 14.

One of the end walls 13 is provided with an overflow device in its upper portion, said device being designated generally at 16, and being illustrated in detail in FIGURE 6. The overflow device 16 comprises a T-shaped conduit fitting 17 having a horizontal stem portion 18 which is formed near its end with a stop flange 19. The end of the stem portion 18 is engaged through an aperture 20 formed in the top portion of the vertical end wall 13 and is fastened thereto by the threaded engagement therein of the inner end 21 of a nipple member 22 which is formed with an annular stop flange 23 corresponding in shape to the stop flange 19. Flat annular sealing washers 24, 24 are interposed between the respective stop flanges 23, 19 and the inner and outer surfaces of the end wall 13, as shown in FIGURE 6, to provide a sealed connection of the stem portion 18 to the end wall 13. A perforated cap member 25 is provided on the inner end of the nipple member 22 to allow water to flow into the nipple member but to prevent the entry of fish into said nipple member during the overflow action, presently to be described.

The T-shaped conduit member 17 is provided with the vertical head portion 26 to the lower end of which is connected a flexible overflow tube 27 which may be employed to conduct the water overflowing from the aquarium to a suitable waste receptacle. When not in use, the open end of the overflow tube 27 may be supportingly engaged in a generally U-shaped bracket member 28 which is secured to the upper portion of end wall 13, as illustrated in FIGURES 1 and 5, as by the use of a suitable adhesive material. The retaining bracket 28 is preferably fastened to the end wall 17 substantially at the same height as the stem portion of the T-shaped conduit fitting 17, so that the open end of the flexible overflow tube 27 will be normally supported at a level higher than the level of the stem portion 18 of the conduit member 17.

The lower end of the head member 26 of the T-shaped conduit 17 is preferably formed with a plurality of annular ribs 29 on which the top portion of the flexible tube 27 is engaged, as shown in FIGURE 6, to insure adequate gripping action of the flexible tube 27 with respect to the head portion 26 of the conduit member 17.

Designated at 30 and 31 are a pair of longitudinally extending horizontal arms which are superimposed over each other and which are provided at their inner end portions with registrable longitudinal slots 32 and 33. The inner portions of the bar members 30 and 31 are slidably connected together by the provision of the respective generally rectangular ring members 34, 34 which are engaged around the overlapping portions of the bar members 30 and 31, as is clearly shown in FIGURE 2, holding the bar members in overlapping, relatively slidable relationship.

The bar members 30 and 31 are formed at their outer ends with depending transverse flanges 35, 36 which are adapted to engage the outer surface of the top rim portion 37 of the aquarium at the top margins of the end walls 13, 13. Respective clamping blocks 38 and 39 are slidably engaged on longitudinally extending depending dovetail ribs 40 and 41 secured to the undersides of the respective bar members 30 and 31 adjacent the depending flanges 35 and 36 thereof, the clamping blocks 38 being urged outwardly toward the respective flanges 35 and 36 by coil springs 42, 43 engaged between the inner ends of the blocks 38, 39 and depending transverse flanges 44, 45 formed integrally with the inner ends of the dovetail ribs 40, 41, as shown in FIGURE 2. Positioning lugs 46 are provided respectively on the blocks 38 and 39 and similar positioning lugs 47 are provided on the depending flanges 44, 45, the lugs 47 facing the lugs 46 and receiving the respective ends of the coil springs 42, 43, whereby the blocks 38 and 39 are biased outwardly by the springs and whereby the springs are retained in operating positions. Thus, the top margins of the respective end walls 13, 13 are clampingly engaged between the blocks 38, 39 and the flanges 35, 36 in the manner illustrated in FIGURE 3, whereby to retain the superimposed longitudinal bars 30, 31 in a selected position overlying the surface of the water in the aquarium.

Designated at 50 is a rigid, right-angled conduit member of glass or other suitable transparent material which is frictionally secured in and supported by a washer member 51 of resilient deformable material at the overlapping inner end portions of the bar members 30, 31. Thus, the conduit member 50 is provided with a vertical depending leg which engages through the washer member 51 and which is formed at its lower end with an enlarged perforated bulb portion 52. The vertical leg of the conduit member 50 extends through the registering slots 32 and 33, as shown in FIGURE 2. The horizontal arm of the conduit member 50 is connected to one end of a flexible water supply tube 54 which is supported on the longitudinal bar member 31 and which is connected at its outer end to a suitable supply conduit 55 connected to a supply of water.

As shown in FIGURE 3, the bar members 30 and 31 are outwardly concaved and are arcuately channel-shaped in transverse cross section, so that the uppermost bar member 31 will nestingly receive and support the flexible conduit 54 in the manner illustrated in FIGURE 2. Upstanding triangular side flanges 56 are provided at the outer ends of the bar members 30 and 31, said side flanges being spaced apart in the manner shown in FIGURE 3 to define guides between which the hose 54 may be disposed.

Obviously, the underlying longitudinal bar member 30 may be employed to support the flexible hose 54, if so desired.

When it is desired to supply aerated fresh water to the aquarium, the overflow hose 27 is disengaged from the supporting clip 28 and is placed in communication with a suitable waste receptacle or drainage means. Water is admitted to the conduit member 50 through the rigid conduit 55 and the flexible conduit 54, the water discharging from the perforated bulb 52 in the form of a large number of fine sprays, whereby the discharging water is aerated as it descends into the aquarium. The conduit 50 is preferably shaped so that the bulb 52 is supported closely subjacent the underlying longitudinal bar member 30, so that the height of the bulb above the surface of the water is substantial, and so that the jets of water from the bulb will travel substantial distances through the air before reaching the surface of the water in the aquarium. As the aerated water is furnished to the aquarium, the level of the water in the aquarium rises, and the excess water leaves the aquarium through the overflow conduit 18 and the discharge tube 27.

As will be readily apparent, since the longitudinal bar members 30 and 31 are adjustable relative to each other so as to vary the effective length of the supporting means for the water supply tube 54 and the aerating conduit 50, the device may be readily adjusted to fit different sizes of aquaria and may be readily mounted on an aquarium without requiring any tools or manipulation of screws or other fastenings.

While a specific embodiment of an improved device for supplying aerated water to an aquarium has been disclosed in the foregoing decription, it will be understood that various modifications within the spirit of the invention may occur to those skilled in the art. Therefore it is intended that no limitations be placed on the invention except as defined by the scope of the appended claims.

What is claimed is:

1. An aerating nozzle supporting device for an aquarium comprising a pair of overlapping elongated support arms, means slidably connecting said support arms, clamping means depending from the outer ends of the support arms and adapted to clampingly engage the top edges of the opposite end walls of an aquarium, and means on said arms defining an upwardly facing longitudinal recess adapted to receive a conduit, said arms being formed with registering apertures at their overlapping portions adapted to receive a depending nozzle element associated with said conduit.

2. An aerating nozzle supporting device for an aquarium comprising a pair of overlapping elongated support arms, means slidably connecting said support arms, and depending clamping means on the outer ends of the support arms adapted to clampingly engage the top edges of the opposite end walls of an aquarium, said arms being upwardly concave in transverse cross section so as to define an upwardly facing longitudinal recess adapted to receive a conduit, said arms being formed with registering apertures at their overlapping portions adapted to receive a depending nozzle element associated with said conduit.

3. An aerating nozzle supporting device for an aquarium comprising a pair of overlapping elongated support arms, means slidably connecting said support arms, depending flanges on the outer ends of the arms, depending clamping blocks slidably supported on the arms inwardly adjacent said flanges, whereby the top edges of the end walls of an aquarium are receivable between said flanges and clamping blocks, spring means acting on the blocks to exert outward clamping force thereon, and means on said arms defining an upwardly facing longitudinal recess adapted to receive a conduit, said arms being formed with registering apertures at their overlapping portions adapted to receive a depending nozzle element associated with said conduit.

4. An aerating nozzle supporting device for an aquarium comprising a pair of overlapping elongated support arms, means slidably connecting said support arms, depending flanges on the outer ends of the arms, depending clamping blocks slidably supported on the arms inwardly adjacent said flanges, whereby the top edges of the end walls of an aquarium are receivable between said flanges and clamping blocks, and spring means acting on the blocks to exert outward clamping force thereon, said arms being upwardly concave in transverse cross section so as to define an upwardly facing longitudinal recess adapted to receive a conduit, said arms being formed with registering longitudinal slots at their overlapping portions adapted to receive a depending nozzle element associated with said conduit.

References Cited in the file of this patent

UNITED STATES PATENTS

| 779,453 | White | Jan. 10, 1905 |
| 1,932,693 | Goodloe | Oct. 31, 1933 |
| 2,842,154 | Lindsley | July 8, 1958 |